United States Patent
Wilson et al.

(10) Patent No.: US 8,196,491 B2
(45) Date of Patent: Jun. 12, 2012

(54) SHIFT SELECTOR APPARATUS

(75) Inventors: Thomas H. Wilson, Indianapolis, IN (US); Linus L. Happ, Brownsburg, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 358 days.

(21) Appl. No.: 12/423,286

(22) Filed: Apr. 14, 2009

(65) Prior Publication Data

US 2009/0272216 A1 Nov. 5, 2009

Related U.S. Application Data

(60) Provisional application No. 61/049,233, filed on Apr. 30, 2008.

(51) Int. Cl.
*B60K 20/00* (2006.01)
(52) U.S. Cl. .................. 74/473.23; 74/473.18
(58) Field of Classification Search ............... 74/473.18, 74/473.23, 473.24, 473.1, 473.12
See application file for complete search history.

(56) References Cited

U.S. PATENT DOCUMENTS

| | | | |
|---|---|---|---|
| 4,070,927 A | 1/1978 | Polak | |
| 4,584,895 A | 4/1986 | Holmes | |
| 4,909,096 A * | 3/1990 | Kobayashi | 74/538 |
| 5,309,744 A * | 5/1994 | Kito et al. | 70/247 |
| 5,406,860 A | 4/1995 | Easton et al. | |
| 5,540,180 A * | 7/1996 | Kataumi et al. | 116/28.1 |
| 5,575,174 A * | 11/1996 | Kanematsu et al. | 74/473.23 |
| 5,601,506 A | 2/1997 | Long et al. | |
| 5,775,165 A | 7/1998 | Lu | |
| 5,799,539 A * | 9/1998 | Haase | 74/473.18 |
| 5,855,182 A | 1/1999 | Kline et al. | |
| 5,884,530 A * | 3/1999 | Sato et al. | 74/473.23 |
| 5,916,291 A | 6/1999 | McKee | |
| 6,006,887 A * | 12/1999 | Tazai | 192/220.2 |
| 6,082,286 A * | 7/2000 | Kovach et al. | 116/28.1 |
| 6,148,686 A * | 11/2000 | Kataumi | 74/473.18 |
| 6,422,106 B1* | 7/2002 | Lee | 74/473.18 |
| 6,510,931 B2 | 1/2003 | Berger et al. | |
| 6,568,294 B2* | 5/2003 | Jezewski | 74/473.18 |
| 6,789,444 B2* | 9/2004 | Fujiwara et al. | 74/473.23 |
| 7,059,209 B2* | 6/2006 | Yamamoto et al. | 74/335 |
| 7,293,480 B2 | 11/2007 | Matsui et al. | |
| 7,308,838 B2 | 12/2007 | Inoguchi et al. | |
| 7,325,665 B2 | 2/2008 | Kamishima et al. | |
| 7,334,497 B2 | 2/2008 | Giefer et al. | |
| 7,350,432 B2 | 4/2008 | Somschor et al. | |
| 7,353,726 B2 | 4/2008 | Beer et al. | |
| 7,393,304 B2* | 7/2008 | Wilde et al. | 477/94 |
| 2003/0114261 A1 | 6/2003 | Moorman et al. | |
| 2005/0223834 A1* | 10/2005 | Otsuka | 74/473.18 |
| 2006/0283279 A1 | 12/2006 | Levin et al. | |

\* cited by examiner

*Primary Examiner* — Thomas Will
*Assistant Examiner* — Abigail A Risic
(74) *Attorney, Agent, or Firm* — Barnes & Thornburg LLP (57) ABSTRACT

A shift selector apparatus is provided. The apparatus includes a first operational zone and a second operational zone. The apparatus provides separation between the two operational zones to prevent accidental shifting between ranges.

17 Claims, 7 Drawing Sheets

SHIFT SELECTOR APPARATUS

CROSS REFERENCE

This application claims the benefit of U.S. Provisional Patent Application No. 61/049,233, filed Apr. 30, 2008, which is incorporated herein by this reference in its entirety.

TECHNICAL FIELD

The present invention relates generally to motor vehicles equipped with automatic transmissions, and more particularly, to shift selectors for such vehicles.

BACKGROUND

In vehicles equipped with automatic transmissions, a shift selector translates commands issued by the vehicle operator into control instructions, and transmits the control instructions to the transmission. Conventional shift selectors provide a shift lever and a number of discrete shift positions, with each shift position corresponding to an available transmission range. The available ranges may include directional ranges as well as a number of different forward ranges. Directional ranges may include reverse, neutral and forward (or "drive"). The number of available ranges generally corresponds to the number of speeds or gears provided by the transmission.

In place of discrete shift positions for each range, bump-shift selectors provide a "bump zone" in which a slight displacement of the shift lever results in an up-shift or downshift from the current gear to the next highest or lowest gear. In order to prevent unintended shifting from a directional range into the bump zone, or vice versa, conventional shift selectors employ a tilting shift lever, or provide a different shift axis for directional shifts and bump-shifts. Tilting shift levers require the operator to tilt the lever to one side to access the bump-shift zone.

SUMMARY

According to one aspect of the present invention, a shift selector apparatus for a vehicle transmission is provided. The apparatus includes a housing, and a shift path defined by the housing. The shift path has a first side, a second side spaced from the first side by a first distance, and a first end and a second end spaced from the first end by a second distance. The second distance is greater than the first distance.

The apparatus also includes a first shift zone provided in the shift path. The first shift zone includes at least first and second selectable shift positions. The first shift position when selected generates a first request to move the vehicle in a first direction, and the second shift position when selected generates a second request to move the vehicle in a second direction different than the first direction.

The apparatus also includes a second shift zone provided in the shift path and spaced from the first shift zone. The second shift zone enables bump-shifting between a plurality of forward ranges. The lever is spring loaded to the center position in the bump zone and momentary movement to the "+" or "−" position achieves up and down shifts, respectively. In certain embodiments, the first distance is substantially the same all along the second distance of the shift path. The shift path may be provided along a longitudinal axis of the housing.

The second shift zone may be longitudinally spaced from the first shift zone. The first shift zone may be defined by a first shift gate and the second shift zone may be defined by a second shift gate. At least the first and second shift positions of the first shift zone may be discretely spaced positions. The discretely spaced positions may be defined by detents supported by the housing. The second shift gate may be provided between the first and second shift zones. The first shift gate may extend into the shift path a first gate distance and the second shift gate may extend into the shift path a second gate distance. The second gate distance may be larger or smaller than the first gate distance.

The apparatus may also include a shift lever and a locking member coupled to the shift lever, wherein the locking member is movable between a first position in which the shift lever is movable along a path which does not clear the first gate distance or the second gate distance, a second position in which the shift lever is movable along a path which clears the first gate distance and does not clear the second gate distance, and a third position in which the shift lever is movable along a path which clears the first gate distance and the second gate distance. The shift lever may be a non-tilting shift lever disposed in the shift path.

According to another aspect of the present invention, a shift lever apparatus for a vehicle transmission is provided. The apparatus includes a lever member having a first end and a second end spaced from the first end, a shift body coupled to the second end of the lever member, a first release coupled to the shift body, the first release having a first position when the first release is activated and a second position when the first release is not activated, and a second release coupled to the shift body, the second release having a first position when the second release is activated and a second position when the second release is not activated, wherein when the first release is in the first position, activating the second release permits movement of the first release to a third position.

Activation of the first release may enable movement of the lever member in a first shift zone comprising a plurality of discrete directional shift positions. Activation of the second release may enable movement of the lever member in a second shift zone spaced from the first shift zone and the lever member may be configured for bump-shifting in the second shift zone.

The first and second releases may be disposed relative to the shift body so that the apparatus is mountable to a vehicle in a first position proximate a right hand of a person and is mountable to the vehicle in a second position proximate a left hand of person.

The first release may be pivotable about a first axis of the shift body and the second release may be movable along a second axis of the shift body.

A locking member may be coupled to the lever member, wherein the locking member has a first position, a second position spaced from the first position, and a third position spaced from the first and second positions, activation of the first release moves the locking member to the second position and combined activation of the first and second releases moves the locking member to the third position. The locking member may be normally biased in the first position.

According to another aspect of the present invention, a method of shifting a vehicle transmission is provided. The method includes activating a first release of a shift selector by applying force to the first release in a first direction to shift from a first directional range to a second directional range, and activating a second release of a shift selector by also applying force to the second release in a second direction to enable shifting between a plurality of forward ranges or between a plurality of reverse ranges of the transmission.

The method may include moving a shift lever along a shift axis after activating the first release to select the second directional range. The method may include moving the shift lever along the shift axis after activating the second release to select one of a plurality of forward ranges or one of a plurality of reverse ranges.

The second direction in which force is applied to the second release may be substantially the same as the first direction in which force is applied to the first release.

The method may comprise a releasing force applied to the first and second releases to hold the shift lever in a shift position. The method may comprise applying a slight or momentary force to a shift body coupled to the shift lever to shift from a first forward range to a second forward range or from a first reverse range to a second reverse range. The method may comprise applying a slight or momentary force to the shift body in a first direction to shift from a first forward range to a second forward range. The method may comprise applying a slight or momentary force to the shift body in a second direction opposite the first direction to shift from the second forward range to the first forward range.

Patentable subject matter may include one or more features or combinations of features shown or described anywhere in this disclosure including the written description, drawings, and claims.

BRIEF DESCRIPTION OF THE DRAWINGS

The detailed description refers to the following figures in which.

In general, like structural elements on different figures refer to identical or functionally similar structural elements although reference numbers may be omitted from certain views of the drawings for simplicity.

DETAILED DESCRIPTION

Aspects of the present invention are described with reference to certain illustrative embodiments shown in the accompanying drawings and described herein. While the present invention is described with reference to the illustrative embodiments, it should be understood that the present invention as claimed is not limited to the disclosed embodiments.

Figure 1:
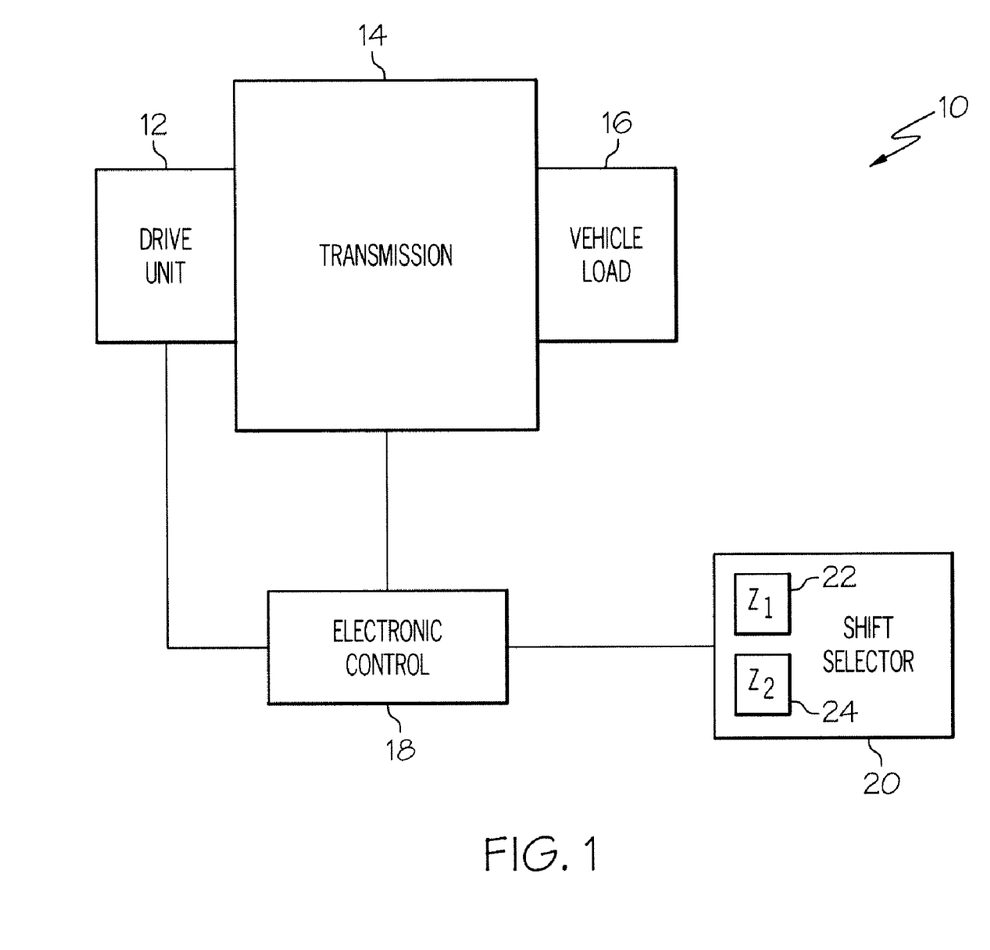
FIG. 1 is a block diagram of a vehicle drive line including a drive unit, and a transmission configured to drive a vehicle load, a transmission control unit and a shift selector.

An embodiment of a vehicle drive line 10 includes a drive unit 12, and a transmission 14 configured to drive a vehicle load 16. A transmission control unit 18 controls operation of transmission 14. A shift selector 20 is coupled to the transmission control unit 18.

Drive unit 12 includes an internal combustion engine, such as a spark-ignited engine or diesel engine, an engine-electric motor combination, or the like. Drive unit 12 is coupled to transmission 14 by a transmission input shaft. A fluidic torque converter (not shown) is generally interposed between drive unit 12 and transmission 14 to selectively establish a mechanical coupling. Transmission 14 is coupled to the vehicle drive wheels in one of several conventional ways.

Transmission 14 is an automatic transmission. Transmission 14 may be of the type described in U.S. Pat. No. 4,070,927 to Polak or another type, and may have an electro-hydraulic control of the type described in U.S. Patent Application Publication No. 2003/0114261 to Moorman, et al. or in U.S. Pat. No. 5,601,506 to Long, et al. or another type. Transmission 14 is shiftable to selectively establish one of several drive conditions including, for example, various combinations of two-wheel-drive and four-wheel drive, high or low speed range, a neutral range, one or more reverse ranges, and a plurality of forward ranges.

The number of available forward ranges is determined by the configuration of the transmission gearsets. For example, transmission 14 may have three interconnected planetary gearsets and five clutches which are controllable to provide six forward gears. Other configurations, such as an eight-speed configuration, may also be used.

Control unit 18 controls operation of transmission 14 based on inputs from drive unit 12, transmission 14, shift selector 20, and/or other inputs. Such inputs may include electrical or analog signals received from sensors, controls or other like devices associated with the vehicle components. For instance, inputs may include signals indicative of transmission input speed, driver requested torque, engine output torque, engine speed, temperature of the hydraulic fluid, transmission output speed, turbine speed, brake position, gear ratio, torque converter slip, and/or other measurable parameters.

Control unit 18 generally includes electrical circuitry configured to process, analyze or evaluate one or more inputs and issue electrical control signals as needed through one or more electrical lines or conductors. Such connections may include hard-wired and/or networked components in any suitable configuration including, for example, insulated wiring and/or wireless transmission as may be appropriate or desired.

Electrical circuitry of control unit 18 includes computer circuitry such as one or more microprocessors and related elements configured to process executable instructions expressed in computer programming code or logic, which is stored in one or more tangible media, i.e., any suitable form of memory or storage media that is accessible or readable by the processor or processors. Control unit 18 may also include analog to digital converters and/or other signal processing circuitry or devices as needed to process one or more of the inputs received from the vehicle components.

While shown schematically as a single block 18, it will be understood by those skilled in the art that portions of control unit 18 may be implemented as separate logical or physical structures. For example, electronic controls for transmission 14 may be physically and/or logically separated from electronic controls for the drive unit 12.

Shift selector 20 is operable in a first zone 22 to initiate shifting of the vehicle from one directional range to another, for example, from park (P) to reverse (R), reverse to neutral (N), neutral to drive (D), drive to neutral, neutral to reverse, drive to low (L), and the like. Shift selector 20 is also operable in a second zone 24 to shift between a plurality of forward ranges, such as from first to second, second to third, third to fourth, fourth to fifth, fifth to sixth, sixth to fifth, fifth to fourth, and so on. Shift selector 20 may also be configured to enable "skip shifts", such as from first to third, sixth to fourth, and the like. An additional zone or zones may be provided to allow rapid manual selection of a frequently used range or ranges when desired, or for other reasons.

Shift selector 20 may include a manual selector wherein the vehicle operator manually or mechanically initiates a range change, e.g. by moving a lever from one position to another. Alternatively or in addition, selector 20 may include an electronically-controlled range selector wherein the vehicle operator depresses a button or switch to initiate the range change, or a range change is automatically initiated by control module 18 or another vehicle control module, such as a cruise control system, upon detection by the transmission of an increase or decrease in vehicle speed resulting from driver or vehicle system behavior (such as an increase or decrease in force applied to the accelerator pedal or brake, receipt of an accelerate, decelerate, or coast command from a cruise control system, or the like). In general, range change requests are transmitted to control 18, which initiates changes in the electro-hydraulic control assembly of the transmission (for example, opening, closing, or changing valve positions), to engage and/or disengage various components (i.e. gears and clutches) of the gear assembly according to the design and operation of the particular transmission.

When a range change is requested or initiated, shift selector 20 sends an electrical signal to electrical control 18, which then sends appropriate control signals to solenoid operated fluid control valves of the transmission electro-hydraulic control assembly. When the range change is requested by the vehicle operator, the electrical signal is generally based on the position of the selector control button or control lever.

Embodiments of a shift selector apparatus 30, 31 according to the present invention are shown in FIGS. 2-8. Apparatus 30 includes a housing 32, a cover plate 46, an aperture 48 defined by cover plate 46. A shift lever 60 has a lever member 62. Lever member 62 has a first end disposed in aperture 48. A shift body 64 is coupled to a second end of lever member 62, which is spaced from the first end.

Figure 2:
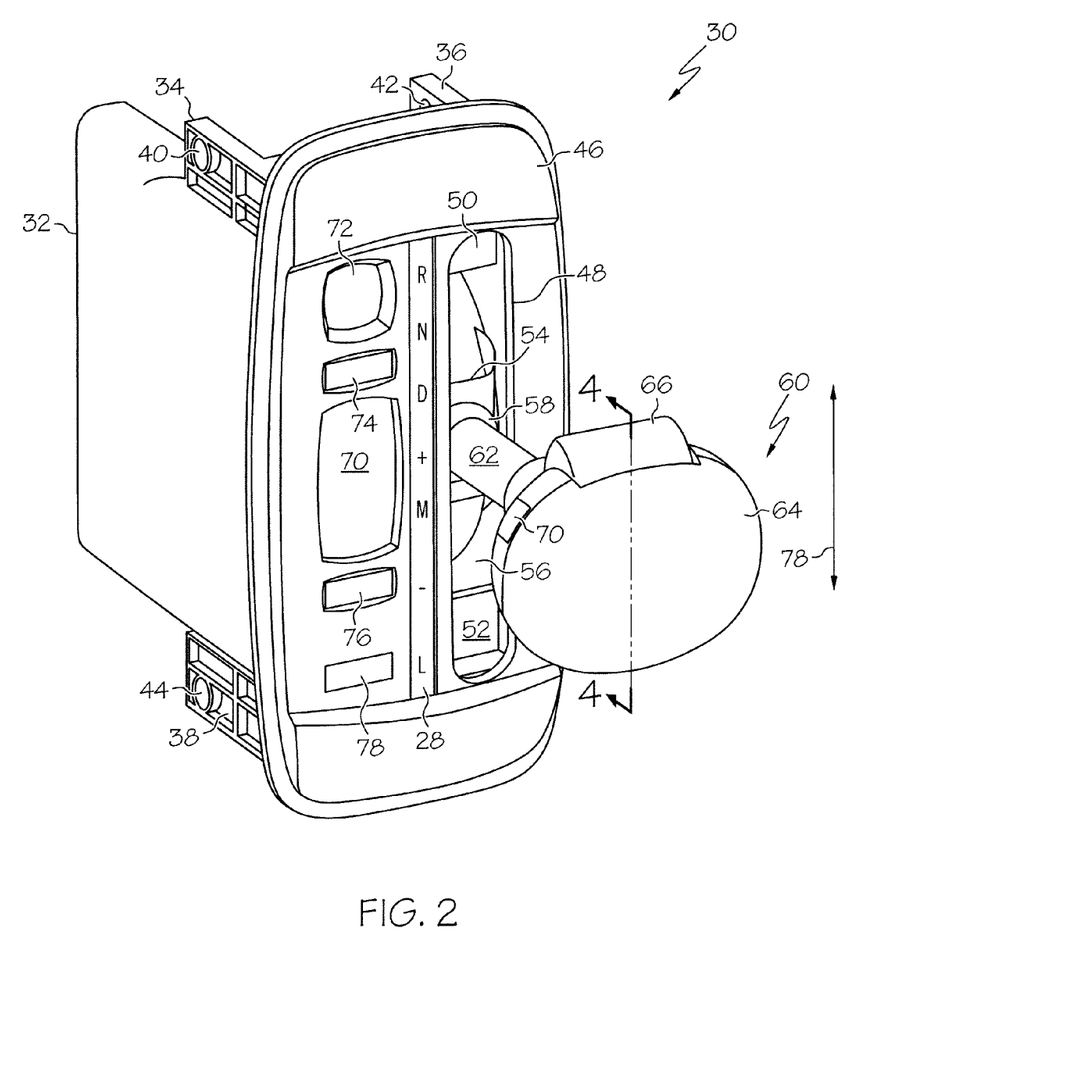
FIG. 2 is a front perspective view of a right-handed embodiment of a bump-shift selector apparatus including a housing, a shift lever, and a shift body coupled to the shift lever.

A plurality of flanges 34, 36, 38 are supported by housing 32. Each flange 34, 36, 38 defines at least one aperture 40, 42, 44 through which screws, or other suitable fasteners, may be inserted to mount housing 32 to a console, instrument panel, floor, or other portion of a vehicle.

Cover plate 46 supports a plurality of controls 72, 78, labels 74, 76, and a display or indicator 70. Apparatus 30 is configured for use by a right-handed vehicle operator. As such, controls 72, 78, labels 74, 76, and display 70 are positioned on the face plate 46 so that the shift lever 60 does not obstruct the operator's view of controls 72, 78, labels 74, 76, and display 70. In the illustrated embodiment, controls 72, 78, labels 74, 76, and display 70 are located to the left of shift lever 60 so that when installed in the vehicle, they are located between the vehicle operator and shift lever 60.

Mode control 72 is a push button that enables the vehicle operator to select one of a plurality of available vehicle operating modes, such as two-wheel drive or four-wheel drive. Display or visual indicator 70 is a digital display that is updated in real time to display the selected or requested range and the currently attained or monitored range. The selected or requested range is displayed in first portion 71 of display 70, while the attained or monitored range is displayed in second portion 73. Select label 74 acts as a visual cue or guide to the vehicle operator to indicate that the first portion 71 displays the selected range. Likewise, monitor label 76 acts as a visual cue or guide to the vehicle operator to indicate that the second portion 73 displays the currently attained range. Diagnostic mode control 78 is a push button that enables the vehicle operator to change the digital display 70. In the illustrated embodiment, depressing the control 78 one time changes the digital display to a first diagnostic mode and depressing and holding the control 78 down changes the digital display to a second diagnostic mode. Different diagnostic data is displayed by display 70 depending upon the diagnostic mode selected.

While controls 72, 78 have been described as push buttons, it will be understood that in other embodiments, levers, switches, dials, or even touchscreen controls may be used to actuate controls 72, 78, Also, labels 74, 76, while shown as fixed printed labels, may be implemented as text displayed on digital display 70. Display 70 may include an LCD display, touchscreen controls or similar devices As such, all of controls 72, 78, labels 74, 76 and portions 71, 73 may be implemented on display 70 instead of as separate elements.

Label 28 is positioned adjacent the shift column or aperture 48. Label 28 includes visual indicators such as R, N, D, and L that are spaced to correspond to the available shift positions. A bump-shift zone is indicated by any of multiple conventions including "+M−", "UP/DOWN", spacing between the D and L indicators, and the like.

Lever member 62 is movable within slot 48 in the directions indicated by bi-directional arrow 79, between first stop 50 and second stop 53. In the illustrated embodiment, stops 50, 53 are the respective ends of the slot 48. In general, lever member 62 moves within slot 48 without needing to translate along any other axis to select any of the ranges. Lever member 62 is supported relative to the interior region defined by housing 32 and cover plate 46 by a lever hub 54 and a collar 58.

Figure 3:
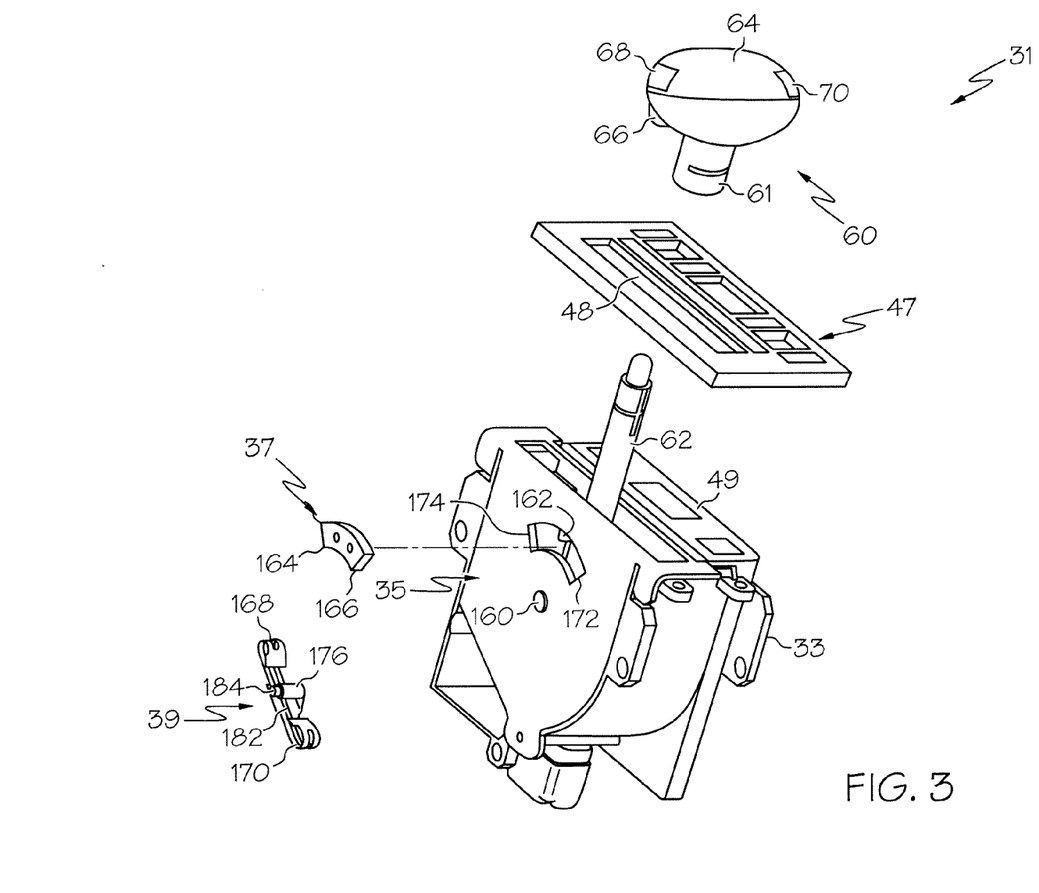
FIG. 3 is an exploded perspective view of a left-handed embodiment of a bump-shift selector apparatus similar to FIG. 2.

FIG. 3 is a partial exploded view of a left-handed embodiment 31 of a shift selector apparatus similar to apparatus 30. Housing 33, face plate 47, and module 35 define an interior region in which additional electronic and mechanical components of apparatus 31 reside. Shift lever 60 is usable in either embodiment 30 or 31 as shown by FIGS. 2 and 3. Face plate 47 has the electrical controls, labels and display positioned to the right of shift lever 60 so that when apparatus 31 is installed in a vehicle, lever 60 does not obstruct the view of such controls by the left-handed operator. Gasketed overlay 49 protects the control electronics from environmental conditions.

As shown in FIG. 3, a stem 61 of shift lever 60 is oriented in and extends through shift path aperture 48 to connect with lever member or stalk 62. Stalk 62 is supported by a hub located within mechanical module 35. In embodiment 31, stalk 62 pivots about pivot point 160 to move along an arc from one shift position to another, whereas in embodiment 30, stalk 62 moves linearly along the shift path 48 and shift body 64 remains in the same plane as stalk 62 moves from one shift position to another.

Mechanical module 35 includes a window or slot 162 spaced from pivot point 160. Lever stop 37 is shaped to correspond to the shape of window 162 and sized to fit within the area of window 162. In the illustrated embodiments 30, 31, window 162 and stop 37 are arc or crescent shaped to correspond with the pivoting action of lever 62. In other embodiments, the corresponding window and slot may be rectangularly shaped to correspond with linear motion of lever 62 in such embodiments.

Stop 37 is coupled to the hub 54, which supports lever member 62. As such, stop 37 travels within slot 162 as the lever member 62 changes position along the shift path 48. Stop 37 has first and second ends 164, 166, which provide "hard" stops, i.e. extreme ends of travel, when either first end 164 abuts first end 174 of slot 162 or second end 166 abuts second end 172 of slot 162. The size and shape (i.e. length, width, and/or thickness) of stop 37 and slot 162 can be configured to be larger or smaller to accommodate a variety of shift selectors having different range configurations or a different number of available of ranges.

Detent spring 39 is supported within module 35 to provide one or more "soft stops", which operate to hold or "pause" lever 62 in a selected position within a gated shift zone. Detent spring 39 is a conventional leaf spring that is configured to engage a conventional detent cam having a plurality of bumps or ripples defining spaced-apart hold positions. Ends 168, 170 curl around posts of the housing so that the bumps or ripples of the cam engage the roller 176. Axle 184 connects roller 176 to the detent spring 39.

Figure 4:
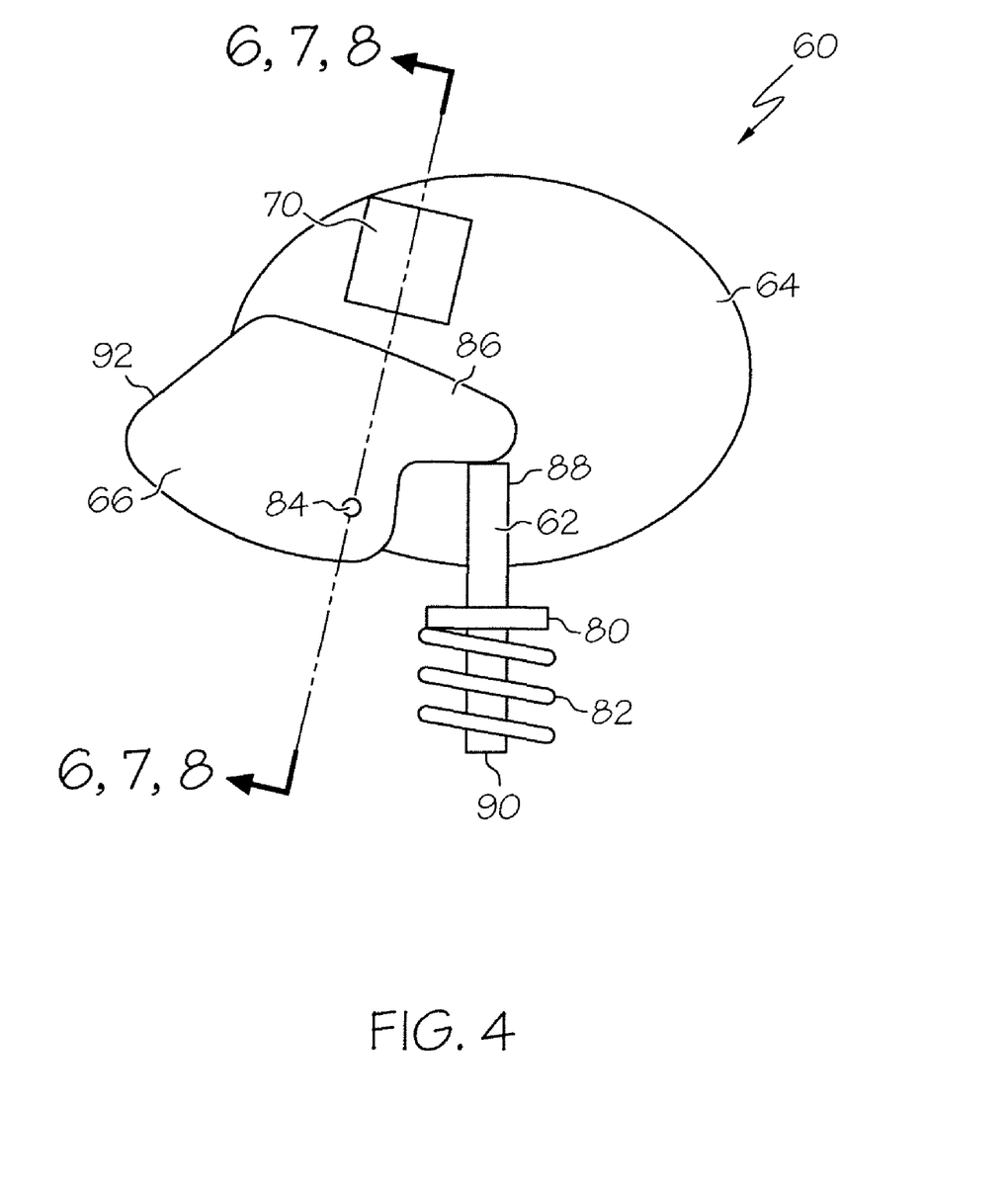
FIG. 4 is a cross section of the shift lever of FIG. 2, taken along line 4-4 of FIG. 2.

Referring to FIG. 4, shift lever 60 has a first release 66 and a second release 68 (not shown), 70 supported by shift body 64. Each of first release 66 and second release 68, 70 is movable relative to shift body 64. The two release system is designed to prevent accidental operation in either of the two gated shift zones. Shift lever 60 also includes a shoulder 80 supported by lever member 62 and a biasing member or spring 82.

Referring to FIGS. 2-3, shoulder 80 and spring 82 are supported by the portion of lever member 62 that extends into the interior region defined by housing 32 and cover plate 46, below, behind, or underneath hub 54, depending upon the mounting orientation of the selector apparatus 30 (i.e., whether it is floor-mounted, console-mounted or panel-mounted).

First release 66 is pivotable relative to shift body 64 about pivot point 84. A pivot axis extends through pivot point 84 perpendicular to the drawing sheet. First release 66 includes a force-receiving portion 92 and a force transmitting portion 86 spaced from portion 92. Lever member 62 is engaged with force transmitting portion 86 of first release 66.

Figure 5:
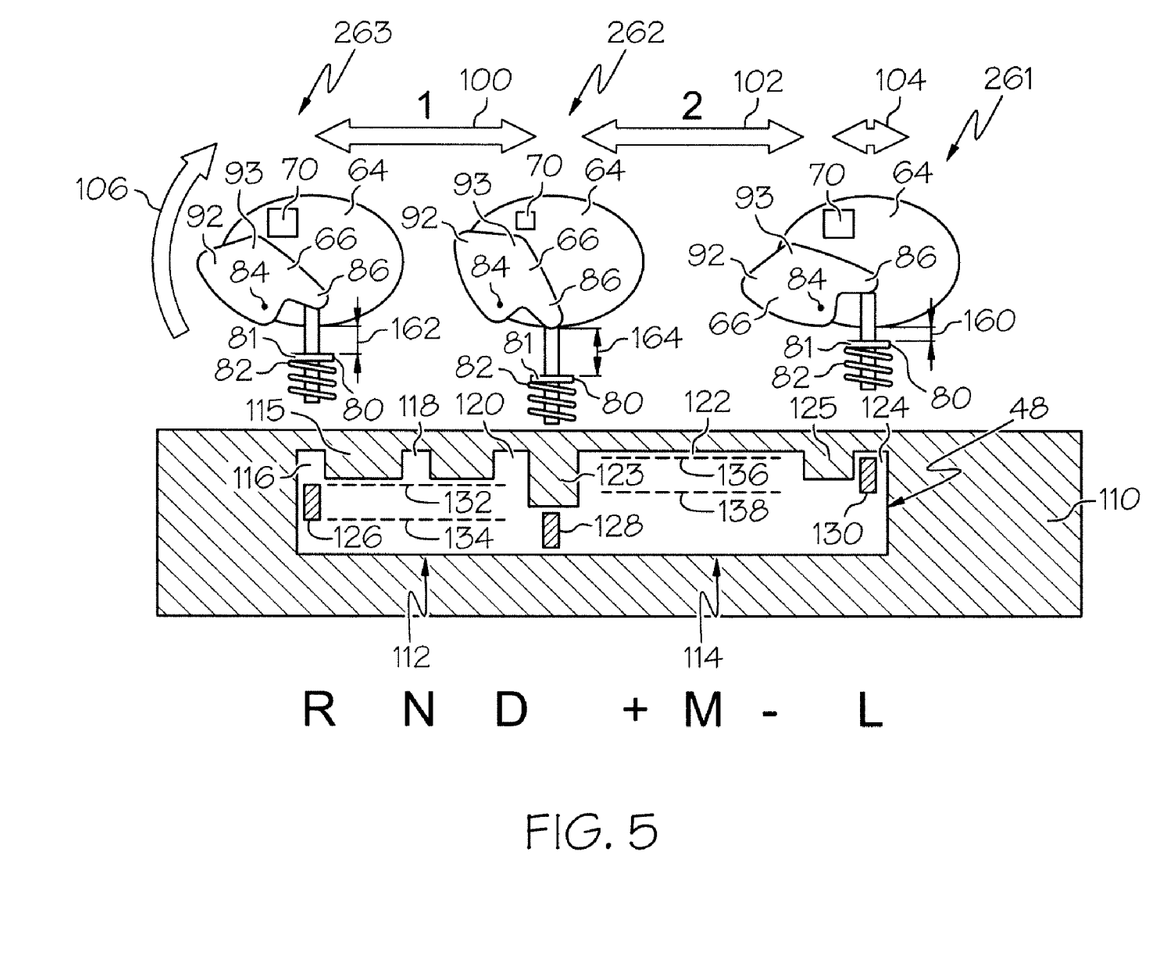
FIG. 5 is a schematic representation of the apparatus of FIG. 2, showing the shift lever in multiple positions and a shift path having two gated shift zones.

Depending on the type of action requested by the vehicle operator, shift lever 60 assumes one of three positions shown in FIG. 5. In the first or "normal" position 261, force is not applied to first release 66 and force is not applied to second release 68, 70. As such, return spring 82 holds the first and second releases 66, 68, 70 in the position shown by element 261 of FIGS. 5 and 6.

In position 261, which is the "normal" position in which neither of the releases is activated, in the illustrated embodiment, no portion of first release 66 engages portion 152 of second release 68, 70. Surface 81 of locking member 80 is at a first distance 160 from shift body 64. Distance 160 is sufficient to enable shift lever 60 to engage discrete notches 116, 118 or 120 of first shift zone 112 or to enable shift lever 60 to travel along line 136 in region 122 of second shift zone 114, or to enable shift lever 60 to engage discrete notch 124. Thus, in the normal position 261, shift lever 60 is selectively held in one of the directional shift positions R (reverse), N (neutral) or D (drive, or forward) of first shift zone 112, or is held in the bump zone 114, or is held in the discrete shift position L (low gear). Schematic arrow element 104 signifies the "hold" position, which is also illustrated schematically with respect to the shift path 48 by block 130.

Shift selector 30 thereby provides two gated zones of operation. In the first zone 112, conventional shift operation by moving the shift lever between discrete shift positions, is provided. In the second zone 114, the operator is permitted to change forward ranges, either higher or lower, by applying a momentary force, or "bumping" the shift lever. As such, the shift lever only moves in two directions, with the second direction being opposite the first direction (i.e. fore and aft).

Figure 6:
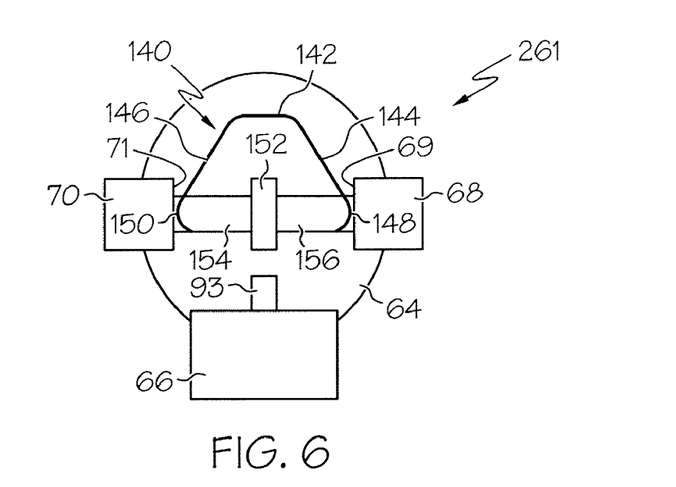
FIG. 6 is a schematic representation of a cross section of the shift body of FIG. 2 taken along line 6,7,8-6,7,8, the shift body being shown in a first configuration wherein a first release is not activated and a second release is also not activated.
Figure 7:
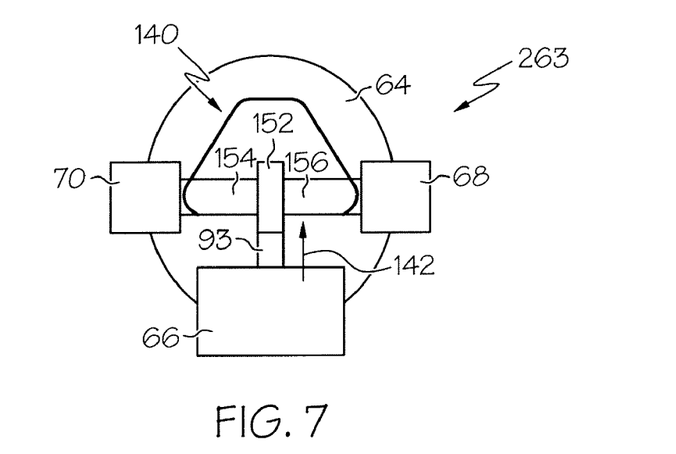
FIG. 7 is a schematic representation of a cross section of the shift body of FIG. 2 taken along line 6,7,8-6,7,8, the shift body being shown in a second configuration wherein a first release is activated and a second release is not activated.

Normally, when second release 68, 70 is not activated, areas 68 and 70 are biased in the position shown in FIGS. 6 and 7 by spring 140. Areas 68 and 70 are coupled to a stop member 152 by cross members 154, 156. Spring 140 has a first member 144 and a second member 146 which are connected by a central portion 142. First member 144 has an end 148 and second member 146 has an end 150. End 148 engages a surface 69 of second release portion 68 and end 150 engages a surface 71 of second release portion 70. In the illustrated embodiment, spring 140 is a dual cantilever spring, however, a pair of coil springs or other suitable arrangement may also be used.

The two opposing release portions 68, 70, are located on opposite sides of shift body 64 so that either release portion 68 or release portion 70 may be depressed to activate second release 68, 70. Only one of release portions 68, 70 needs to be activated to achieve the release. With activating buttons on both sides of the selector knob, left or right hand mounting options are provided. This feature eliminates the requirement to stock both left and right hand style shift levers.

Application of force to area 92 of first release 66 rotates first release about pivot point 84 in the direction of arrow 106 of FIG. 5, causing area 86 to rotate clockwise, transmitting the applied force to lever member 62, to axially translate lever member 62 downwardly so that shift lever 60 achieves position 263. Portion 93 of first release 66 moves in the direction of arrow 142 and engages stop member 152, as shown in FIG. 7. Stop member 152 thereby stops the movement of first release 66 and holds it in the intermediate position 263 while first release 66 is activated.

In position 263, locking member or shoulder 80 is at a second distance 162 from shift body 64, and the second distance 162 is greater than the first distance 160. Spring 82 is partially compressed. If shift lever 60 is in the first zone 112, distance 162 is sufficient to reposition the portion of shift lever 60 represented schematically by element 126 to clear the first gate 115 of first shift zone 112 and travel along line 132. If shift lever 60 is in the second shift zone 114, distance 162 is sufficient for the portion of shift lever 60 represented schematically by elements 128, 130 to travel along line 138 and clear gate 125 to engage notch 124 and select the low (L) gear.

However, distance 162 is not sufficient to enable shift lever 60 to clear gate 123. Therefore, if shift lever 60 is in the first zone 112, activating first release 66 only will not allow shift lever 60 to move into the second zone 114, and if shift lever 60 is in the second zone 114, activating the first release 66 only will not allow shift lever 60 to move into the first zone 112.

After force is released from first release 66, spring 82 returns locking member 80, lever member 62 and first release 66 to position 261.

Figure 8:
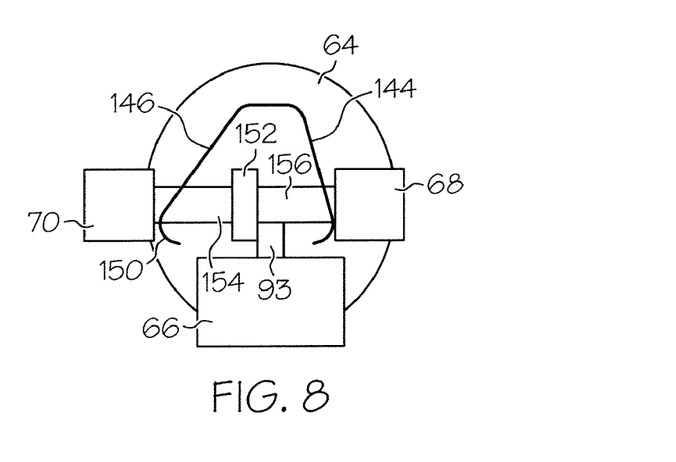
FIG. 8 is a schematic representation of a cross section of the shift body of FIG. 2 taken along line 6,7,8-6,7,8, the shift body being shown in a third configuration wherein a first release and a second release are activated.

Application of force to either area 68 or area 70 of the second release 68, 70 moves stop 152 out of the path of travel of portion 93 of first release 66, as shown in FIG. 8. When stop 152 is displaced by activation of second release 68, 70, first release 66 pivots further about pivot point 84 in the clockwise direction, and force-transmitting portion 86 transfers the force applied to second release 68, 70 to translate lever member 62 further downwardly. As a result, surface 81 of locking member 80 is displaced from shift body 64 by a distance 164. Distance 164 is sufficient to enable the portion of shift lever 60 represented schematically by element 128 to travel along line 134 in the shift path and clear gate 123. Thus, activation of second release 68, 70 in conjunction with first release 66 enables shift lever 60 to move from the first shift zone 112 to the second shift zone 114. After the applied force is released from first release 66 and second release 68, 70, spring 140 returns release 68, 70 to the position shown in FIGS. 6 and 7.

FIGS. 9-12 schematically illustrate another embodiment 200 of a shift body including a first release and a second release. In embodiment 200, a first release 202 and a second release 204 are operable by application of force in the same direction, rather than in opposite directions, as in the embodiments 30 and 31 of FIGS. 2 and 3. In other words, rather than applying a first force to a first release in a first direction and then applying a second force to a second release in a second direction, in embodiment 200, both the first and second forces are applied in the same direction shown by arrow 220 of FIGS. 10-11. As such, first and second releases of embodiment 200 may be activated by substantially the same motion of the vehicle operator's hand. For example, first release 202 is activated by a first squeezing or gripping motion and second release 204 is activated by a second squeezing or gripping motion in the same direction as the first motion.

Figure 9:
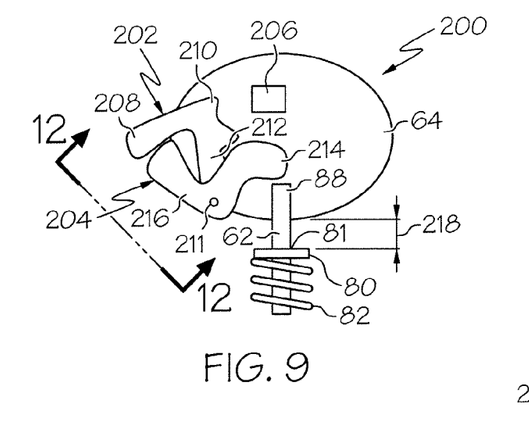
FIGS. 9-12 illustrate another embodiment of a shift lever including a first release and a second release.

First release 202 has a first portion 208, a second portion 210 spaced from the first portion, and a third portion 212 spaced from the first portion 208 and the second portion 210. Second release 204 has a first portion 214 and a second portion 216 spaced from the first portion 214. Both first and second releases 202, 204 are movable relative to shift body 64. Both of first release 202 and second release 204 are pivotable about a pivot point 211.

FIG. 9 shows a first position of shift lever 200, in which neither first release 202 nor second release 204 are activated. When neither release is activated, return spring 82 holds the releases in the non-activated position, in which the distance 218 between shift body 64 and surface 81 of locking member or shoulder 80 is sufficient to engage locking member or shoulder 80 with one of notches 116, 118, 120 or 124, or to enable locking member or shoulder 80 to travel along line 136 in zone 122 as shown in FIG. 5 and described above.

Figure 10:
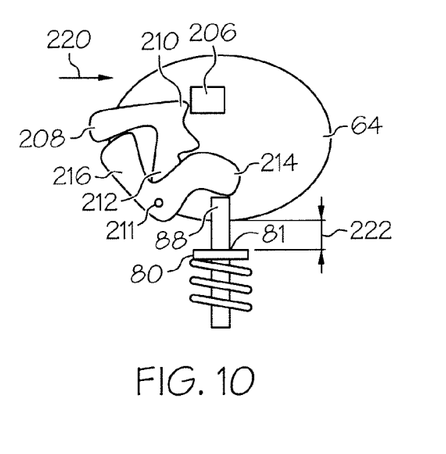

FIG. 10 shows a second position of lever 200, in which first release 202 is activated or engaged. In the illustrated embodiment, first release 202 is activated by applying force to portion 208 of first release 202, in the direction of arrow 220. Application of force to portion 208 moves portion 210 of first release into contact with stop 206. When portion 210 abuts stop 206, portion 212 translates portion 214 of second release 204 in a clockwise or downwardly direction to engage top 88 of lever member 62. The positioning of stop 206 results in locking member or shoulder 80 translating to an intermediate or second position, which is a second distance 222 from shift body 64. Second distance 222 is greater than first distance 218. Distance 222 is sufficient for the portion of shift lever 200 schematically represented by element 126 to travel along line 132 and move between the discrete shift positions of zone 112, or to move between bump position 122 and low position 124 of zone 114, as shown in FIG. 5 and described above. However, distance 222 is not sufficient for lever 200 to move from shift zone 112 to shift zone 114 or to move from shift zone 114 to shift zone 112.

Figure 11:
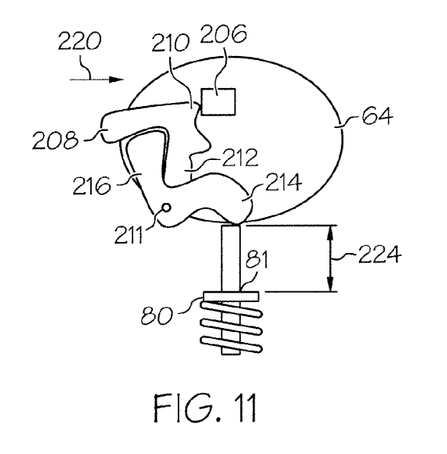

FIG. 11 shows a third position of lever 200, in which second release 204 is activated. Second release 204 is activated by applying force to portion 216 to rotate release 204 about pivot point 211. Such rotation causes portion 214 to rotate further in a clockwise or downwardly direction to further axially translate lever member 62. In the third position, locking member 80 is a third distance 224 from shift body 64. Third distance 224 is sufficient for the portion of shift lever 200 schematically represented by element 128 to clear gate 123 and travel along line 134, and thus enables lever 200 to move from zone 112 to zone 114 or vice versa, as shown in FIG. 5 and described above.

Figure 12:
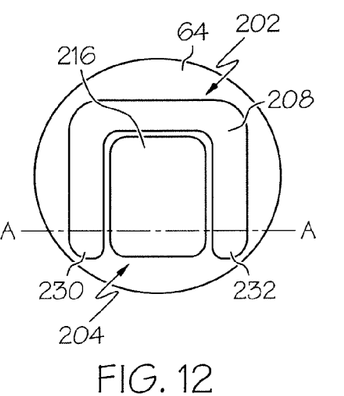

A cross section of shift body 64 is shown in FIG. 12. As shown, first release 202 has a first finger 230 and a second finger 232 spaced from first finger 230 by portion 208. Fingers 230, 232 are proximate the pivot point 211 and support the portion 208 so that either a right-handed person or a left-handed person can activate the first release 202 by pressing the portion 208. The force-receiving area 216 of second release 204 is positioned between fingers 230, 232 so that a similar gripping, pressing or squeezing motion may be used to activate second release 204.

The disclosed embodiments of a shift selector apparatus are designed to enable bump-shifting to be provided in vehicles that have limited space for mounting the shift selector and in vehicles that have a number of forward ranges available. The ability to perform bump-shifts provides access to all transmission ranges without requiring an equivalent number of discrete lever positions. It also reduces the number of different lever selector styles that must be stocked for transmissions with various numbers of forward ranges.

The disclosed dual release system allows the operator to easily access either the directional or bump shift zone or operate within either zone without inadvertently changing zones. Depressing the first (standard) release allows movement between R, N and D. Releasing the first release locks the lever in R, N, D or L. Pressing both releases simultaneously positions the locking member to clear the stops separating the direction and bump zone. Within the bump zone, a detent system centers the lever at a hold position. Momentarily moving the lever forward and backward requests up-shifts and down-shifts respectively. Depressing the first release while in the bump zone allows movement in and out of L.

The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

The invention claimed is:

1. A shift selector apparatus for a vehicle transmission, comprising
   a housing,
   a shift path defined by the housing, the shift path having a first side, a second side spaced from the first side by a first distance, a first end and a second end spaced from the first end by a second distance, the second distance being greater than the first distance,
   a first shift zone provided in the shift path, the first shift zone including at least first and second selectable shift positions, the first shift position when selected generating a first request to move the vehicle in a first direction, and the second shift position when selected generating a second request to move the vehicle in a second direction different than the first direction, a second shift zone provided in the shift path and spaced from the first shift zone, the second shift zone configured to enable bump-shifting between a plurality of forward ranges, a shift lever movable along the shift path, the shift lever including a first release and a second release, and a locking member coupled to the shift lever, wherein the first release is movable between a first position and a second position of the first release, the first release is biased toward the first position, the second release is movable between a first position and a second position of the second release, the second release is biased toward the first position of the second release, the locking member is movable between a first position of the locking member in which the shift lever is blocked from moving between the selectable shift positions of the first shift zone and from moving between the first shift zone and the second shift zone, a second position of the locking member in which the shift lever is movable between the selectable shift positions and blocked from moving between the first shift zone and the second shift zone, and a third position of the locking member in which the shift lever is movable between the selectable shift positions and between the first shift zone and the second shift zone, and movement of the locking member to the third position of the locking member is blocked until the first release is moved away from the first position of the first release concurrently with the second release being moved away from the first position of the second release.

2. The apparatus of claim 1, wherein the first distance is substantially the same all along the second distance.

3. The apparatus of claim 2, wherein the shift path extends along a longitudinal axis of the housing.

4. The apparatus of claim 3, wherein the second shift zone is longitudinally spaced from the first shift zone.

5. The apparatus of claim 1, wherein the first shift zone is defined by a first shift gate and the second shift zone is defined by a second shift gate.

6. The apparatus of claim 5, wherein at least the first and second shift positions of the first shift zone are discretely spaced positions.

7. The apparatus of claim 6, wherein the discretely spaced positions are defined by detents supported by the housing.

8. The apparatus of claim 5, wherein the second shift gate is provided between the first and second shift zones.

9. The apparatus of claim 5, wherein the first shift gate extends into the shift path a first gate distance and the second shift gate extends into the shift path a second gate distance, and the second gate distance is larger than the first gate distance.

10. The apparatus of claim 9, wherein the locking member in the first position of the locking member is movable along a path which does not clear the first gate distance or the second gate distance, in the second position of the locking member is movable along a path which clears the first gate distance and does not clear the second gate distance, and in the third position of the locking member is movable along a path which clears the first gate distance and the second gate distance.

11. The apparatus of claim 1, shift lever is non-tilting and is disposed in the shift path.

12. A shift lever apparatus for a vehicle transmission, comprising a lever member having a first end and a second end spaced from the first end, a shift body coupled to the second end of the lever member, a first release coupled to the shift body, the first release having a first position when the first release is activated and a second position when the first release is not activated, and a second release coupled to the shift body, the second release having a first position when the second release is activated and a second position when the second release is not activated, wherein when the first release is in the first position, activating the second release permits movement of the first release relative to the shift body to a third position different from the first and second positions, wherein activation of the first release enables movement of the lever member in a first shift zone comprising a plurality of discrete directional shift positions.

13. The apparatus of claim 12, wherein activation of the second release enables movement of the lever member in a second shift zone spaced from the first shift zone and the lever member is configured for bump-shifting in the second shift zone.

14. The apparatus of claim 12, wherein the first and second releases are disposed relative to the shift body so that the apparatus is mountable to a vehicle in a first position proximate a right hand of a person and is mountable to the vehicle in a second position proximate a left hand of a person without modifying the apparatus.

15. The apparatus of claim 12, wherein the first release is pivotable about a first axis of the shift body and the second release is movable along a second axis of the shift body.

16. A shift lever apparatus for a vehicle transmission, comprising a lever member having a first end and a second end spaced from the first end, a shift body coupled to the second end of the lever member, a first release coupled to the shift body, the first release having a first position when the first release is activated and a second position when the first release is not activated, a second release coupled to the shift body, the second release having a first position when the second release is activated and a second position when the second release is not activated, wherein when the first release is in the first position, activating the second release permits movement of the first release relative to the shift body to a third position different from the first and second positions, and a locking member coupled to the lever member, wherein the locking member has a first position, a second position spaced from the first position, and a third position spaced from the first and second positions, activation of the first release moves the locking member to the second position and activation of the second release moves the locking member to the third position.

17. The apparatus of claim 16, wherein the locking member is normally biased in the first position.

* * * * *